United States Patent
Dover et al.

(10) Patent No.: US 9,146,856 B2
(45) Date of Patent: Sep. 29, 2015

(54) REMAPPING AND COMPACTING IN A MEMORY DEVICE

(75) Inventors: Lance Dover, Citrus Heights, CA (US); Jim Cooke, Punta Gorda, FL (US); Peter Feeley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 523 days.

(21) Appl. No.: 13/443,306

(22) Filed: Apr. 10, 2012

(65) Prior Publication Data

US 2013/0268719 A1 Oct. 10, 2013

(51) Int. Cl.
 *G06F 12/00* (2006.01)
 *G06F 12/02* (2006.01)

(52) U.S. Cl.
 CPC .... *G06F 12/0246* (2013.01); *G06F 2212/7205* (2013.01); *G06F 2212/7207* (2013.01)

(58) Field of Classification Search
 CPC ..... G06F 3/0608; G06F 3/064; G06F 3/0656; G06F 3/0683; G06F 12/0223; G06F 12/0638; G06F 12/0686; G06F 13/124; G06F 13/1642; G06F 13/1673
 USPC ............ 711/154, 166, 170, 165, 202; 710/33, 710/39, 53, 311; 712/225
 See application file for complete search history.

(56) References Cited

U.S. PATENT DOCUMENTS

| | | | | |
|---|---|---|---|---|
| 6,433,787 | B1 * | 8/2002 | Murphy | 345/556 |
| 6,751,705 | B1 * | 6/2004 | Solomon et al. | 711/122 |
| 6,880,022 | B1 * | 4/2005 | Waldspurger et al. | 710/9 |
| 7,275,144 | B2 | 9/2007 | Mukaida et al. | |
| 7,958,439 | B2 | 6/2011 | Nobunaga et al. | |
| 8,055,816 | B2 * | 11/2011 | Asnaashari et al. | 710/39 |
| 8,060,687 | B2 | 11/2011 | Yuan et al. | |
| 8,583,868 | B2 * | 11/2013 | Belluomini et al. | 711/114 |
| 8,904,091 | B1 * | 12/2014 | Guda et al. | 711/103 |
| 2001/0012222 | A1 | 8/2001 | Terasaki | |
| 2005/0144367 | A1 * | 6/2005 | Sinclair | 711/103 |
| 2007/0234182 | A1 * | 10/2007 | Wickeraad et al. | 714/763 |
| 2008/0046641 | A1 | 2/2008 | Lasser | |
| 2008/0270730 | A1 | 10/2008 | Lasser et al. | |
| 2009/0157948 | A1 * | 6/2009 | Trichina et al. | 711/103 |
| 2009/0158124 | A1 | 6/2009 | Kawai et al. | |
| 2010/0161888 | A1 * | 6/2010 | Eggleston | 711/103 |
| 2010/0180105 | A1 * | 7/2010 | Asnaashari | 712/226 |
| 2010/0191919 | A1 * | 7/2010 | Bernstein et al. | 711/141 |
| 2010/0223420 | A1 * | 9/2010 | Ahn et al. | 711/103 |
| 2010/0332894 | A1 | 12/2010 | Bowers et al. | |
| 2011/0191654 | A1 | 8/2011 | Rub | |
| 2011/0239088 | A1 | 9/2011 | Post | |
| 2011/0252187 | A1 * | 10/2011 | Segal et al. | 711/103 |
| 2011/0307762 | A1 | 12/2011 | Tiziani et al. | |
| 2012/0151253 | A1 * | 6/2012 | Horn | 714/6.22 |
| 2012/0304024 | A1 * | 11/2012 | Rohleder et al. | 714/49 |
| 2013/0013865 | A1 * | 1/2013 | Venkatesh et al. | 711/133 |

\* cited by examiner

*Primary Examiner* — Reba I Elmore (74) *Attorney, Agent, or Firm* — Dicke, Billig & Czaja, PLLC (57) ABSTRACT

Methods for remapping and/or compacting data in memory devices, memory devices, and systems are disclosed. One such method of remapping and/or compacting data includes reducing a first quantity of write operations that are received from a host to a second quantity of write operations for programming to a page of a memory device that are within the specifications of partial page write operations for the memory device. The second quantity of write operations can also remap data that were originally intended to be programmed to memory address ranges that conflict with a memory map of the memory device.

26 Claims, 6 Drawing Sheets

FIG. 1

| ADDRESS (H) | | DATA SIZE | NOP | |
|---|---|---|---|---|
| 0 | 3FF | 1024 | 1 | |
| 400 | 41F | 32 | 1 | SPARE AREA |
| 420 | 81F | 1024 | 2 | |
| 820 | 83F | 32 | 2 | SPARE AREA |
| 840 | C3F | 1024 | 3 | |
| C40 | C5F | 32 | 3 | SPARE AREA |
| C60 | 105F | 1024 | 4 | |
| 1060 | 107F | 32 | 4 | SPARE AREA |

FIG. 2

| ADDRESS (H) | | DATA SIZE | NOP | |
|---|---|---|---|---|
| 0 | 1FF | 512 | 1 | |
| 200 | 3FF | 512 | 1 | |
| 400 | 5FF | 512 | 2 | |
| 600 | 7FF | 512 | 2 | |
| 800 | 80F | 16 | 1 | MOVE 32 BYTES FROM 800 TO 400 |
| 810 | 81F | 16 | 1 | |
| 820 | 82F | 16 | 2 | KEEP THESE 32 BYTES HERE |
| 830 | 83F | 16 | 2 | |
| 840 | A3F | 512 | 3 | |
| A40 | C3F | 512 | 3 | |
| C40 | E3F | 512 | 4 | |
| E40 | 103F | 512 | 4 | |
| 1040 | 104F | 16 | 3 | MOVE 32 BYTES FROM 1040 TO C40 |
| 1050 | 105F | 16 | 3 | |
| 1060 | 106F | 16 | 4 | KEEP THESE 32 BYTES HERE |
| 1070 | 107F | 16 | 4 | |

FIG. 3

| ADDRESS (H) | | DATA SIZE | NOP | |
|---|---|---|---|---|
| 0 | 3FF | 1024 | 1 | |
| 400 | 7FF | 1024 | 2 | |
| 800 | BFF | 1024 | 3 | |
| C00 | FFF | 1024 | 4 | |
| 1000 | 101F | 32 | 1 | MOVE 32 BYTES FROM 1000 TO 400 |
| 1020 | 103F | 32 | 2 | MOVE 32 BYTES FROM 1020 TO 820 |
| 1040 | 105F | 32 | 3 | MOVE 32 BYTES FROM 1040 TO C40 |
| 1060 | 107F | 32 | 4 | KEEP THESE 32 BYTES HERE |

FIG. 4

| ADDRESS (H) | | DATA SIZE | NOP |
|---|---|---|---|
| 0 | 1FF | 512 | 1 |
| 200 | 3FF | 512 | 1 |
| 400 | 40F | 16 | 1 |
| 410 | 41F | 16 | 1 |
| 420 | 61F | 512 | 2 |
| 620 | 81F | 512 | 2 |
| 820 | 82F | 16 | 2 |
| 830 | 83F | 16 | 2 |
| 840 | A3F | 512 | 3 |
| A40 | A4F | 512 | 3 |
| A50 | C4F | 16 | 3 |
| C50 | C5F | 16 | 3 |
| C60 | E5F | 512 | 4 |
| E60 | E6F | 512 | 4 |
| E70 | 106F | 16 | 4 |
| 1070 | 107F | 16 | 4 |

REMAPPING AND COMPACTING IN A MEMORY DEVICE

TECHNICAL FIELD

The present embodiments relate generally to memory and a particular embodiment relates to remapping and compacting in a memory device.

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the cells, through programming of a charge storage structure, such as floating gates or trapping layers or other physical phenomena, determine the data state of each cell. Common uses for flash memory include personal computers, personal digital assistants (PDAs), digital cameras, digital media players, digital recorders, games, appliances, vehicles, wireless devices, cellular telephones, and removable memory modules, and the uses for flash memory continue to expand.

Non-volatile memory can utilize different architectures including NOR and NAND. The architecture designation is derived from the logic used to read the devices. In NOR architecture, a logical column of memory cells is coupled in parallel with each memory cell coupled to a data line, such as those typically referred to as bit lines. In NAND architecture, a column of memory cells is coupled in series with only the first memory cell of the column coupled to a bit line.

Recognizing that errors might occur in the reading of data values from the memory device, the memory device might employ one or more types of error correction methods. Error correction schemes, commonly referred to as error correction codes (ECC), can be implemented in order to detect and/or attempt to correct these errors. ECCs comprise codes in which each data signal subjected to the ECC should conform to the specific rules of construction of the ECC. Departures from this construction of data (i.e., errors) that are not too great can generally be automatically detected and sometimes corrected.

Non-volatile memory devices (e.g., NAND memory) have typically relied on a host to provide error detection and correction (e.g., external EDAC) data to the memory device. In other words, as user data is being written to the NAND memory device from the host, the host also generates the ECC data (e.g., parity data) to be stored along with the user data.

NAND memory devices are typically organized in memory blocks that are further organized into pages of data. Each page is assigned a certain amount of extra storage capability (e.g., in a spare memory area) in order to store the ECC data as well as other relevant data such as address pointers and power-loss recovery data. The additional relevant data can be referred to generically as metadata. The spare memory area for each page can be, for example, 16 additional bytes per 512 bytes of user data storage where part of the spare area is for ECC data and the rest for metadata. However, there are no standard addresses in a page in which to store either the ECC data or the metadata. The ECC data and metadata can be stored anywhere in the page. Once a location/method for storage is selected, the host tends to consistently use this location/method throughout each page in the memory device.

Relatively new types of non-volatile memory devices rely on the memory device to perform the error detection and correction (e.g., internal EDAC). In such a memory device, the host provides the user data to be stored (along with host generated metadata) and the memory device analyzes the data and generates the ECC data to be stored with the received data.

A problem can occur if a user wants to use an internal EDAC memory in a system that conventionally used an external EDAC memory. Since there are no standard addresses for storing metadata in the page, conflicts can arise, such as where a host might attempt to store user data in a location in the page of internal EDAC memory where the internal EDAC memory stores metadata.

One way around this is to rewrite host software to change where the user data/metadata is being stored. However, this could impose a burden on the manufacturer of the host.

For the reasons stated above and for other reasons that will become apparent to those skilled in the art upon reading and understanding the present specification, there is a need in the art for data remapping and/or compacting in a memory device.

DETAILED DESCRIPTION

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Figure 1:
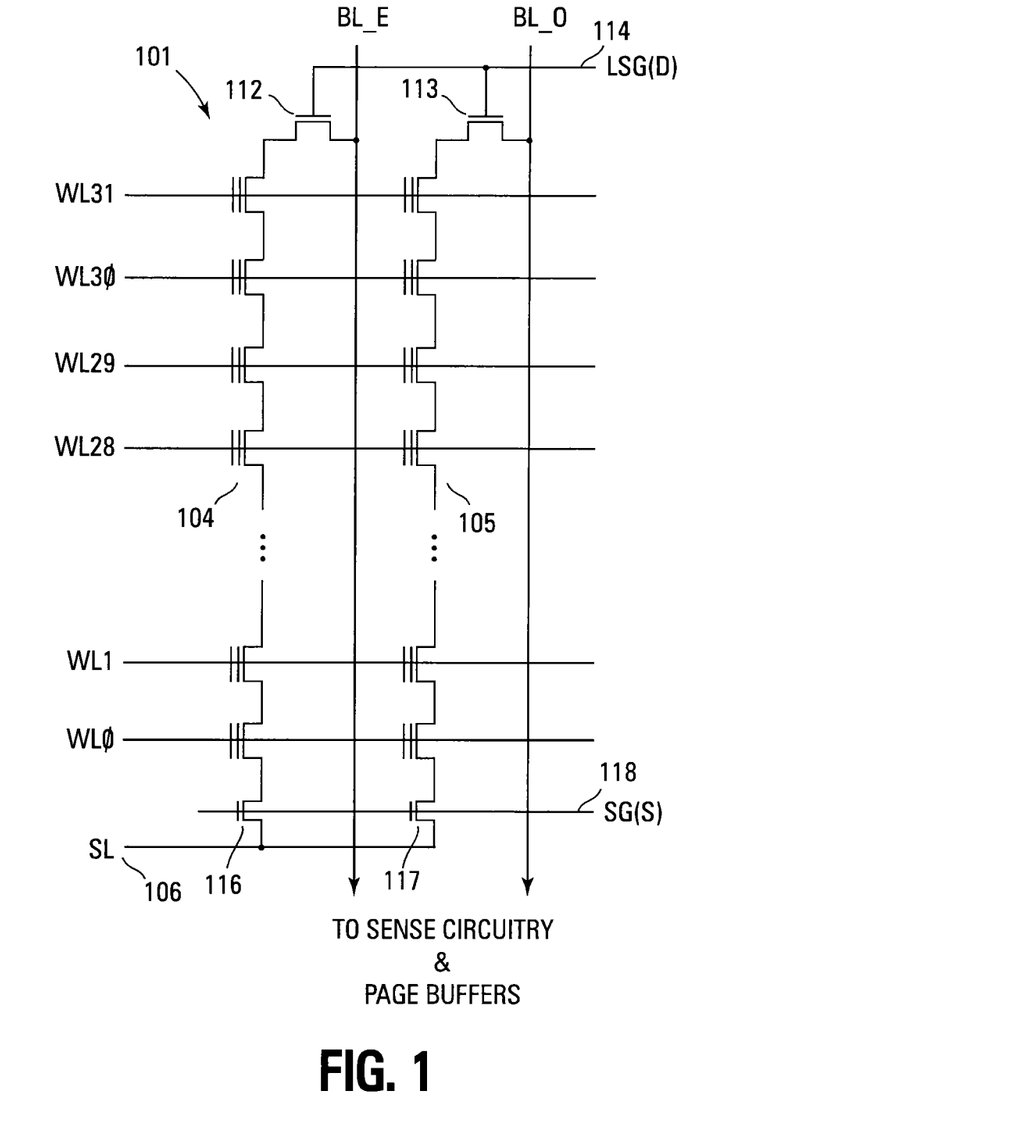
FIG. 1 shows a schematic diagram of one embodiment of a portion of a NAND architecture memory array.

FIG. 1 illustrates a schematic diagram of one embodiment of a portion of a NAND architecture memory array 101 comprising series strings of non-volatile memory cells. The present embodiments of the memory array are not limited to the illustrated NAND architecture.

The memory array 101 comprises an array of non-volatile memory cells (e.g., floating gate) arranged in columns such as series strings 104, 105. Each of the cells is coupled drain to source in each series string 104, 105. An access line (e.g., word line) WL0-WL31 that spans across multiple series strings 104, 105 is coupled to the control gates of each memory cell in a row in order to bias the control gates of the memory cells in the row. Data lines, such as even/odd bit lines BL_E, BL_O, are coupled to the series strings and eventually coupled to sense circuitry that detects the state of each cell by sensing current or voltage on a selected bit line.

Each series string 104, 105 of memory cells is coupled to a source line 106 by a source select gate 116, 117 (e.g., transistor) and to an individual bit line BL_E, BL_O by a drain select gate 112, 113 (e.g., transistor). The source select gates 116, 117 are controlled by a source select gate control line SG(S) 118 coupled to their control gates. The drain select gates 112, 113 are controlled by a drain select gate control line SG(D) 114.

In a typical prior art programming of the memory array, each memory cell is individually programmed as either a single level cell (SLC) or a multiple level cell (MLC). The prior art uses a cell's threshold voltage ($V_t$) as an indication of the data stored in the cell. For example, in an SLC, a $V_t$ of 2.5V might indicate a programmed cell while a $V_t$ of −0.5V might indicate an erased cell. An MLC uses multiple $V_t$ ranges that each indicates a different state. Multiple level cells can take advantage of the analog nature of a traditional flash cell by assigning a bit pattern to a specific $V_t$ range.

While the subsequent discussion uses a NAND architecture as an example memory array architecture, the present embodiments are not limited to any one type of memory architecture. For example, the present embodiments can also work in NOR, AND, phase change memory, spin transfer torque RAM, resistive RAM, or other types of memory.

Subsequent discussions refer to metadata that is generated by a host that is communicating with the memory device. As is known in the art, metadata can encompass many different types of data. For example, metadata might include memory pointers, power-loss recovery structures, and/or data type indicators. In one embodiment, a particular group of metadata (e.g., 16 bytes) is associated with a particular group of page data (e.g, 512 bytes).

Figure 2:
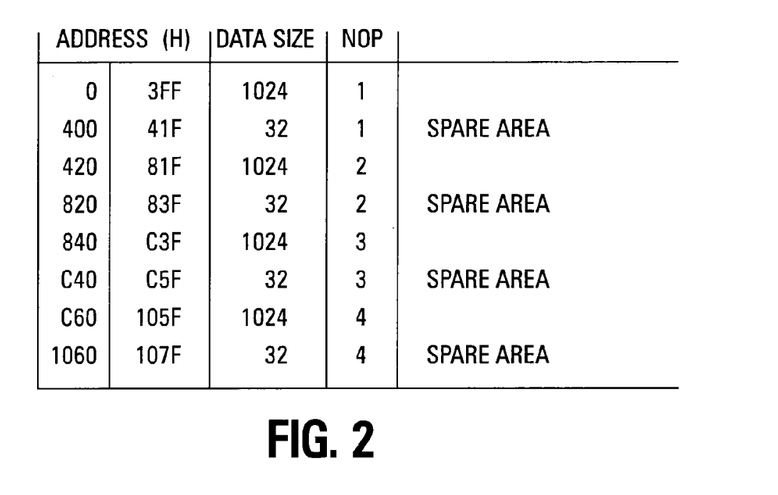
FIG. 2 shows one embodiment of a memory map for a memory device.

FIG. 2 illustrates one embodiment of a memory map of a memory device that performs the error detection and correction (EDAC) internally (e.g., internal EDAC). The memory map of FIG. 2 illustrates a page of memory including an area for user data storage (e.g., 4 k bytes) plus a particular amount of spare area (e.g., 128 bytes) that, in the illustrated embodiment, is used for metadata and not ECC data generated by the memory device (which is stored in a location not made available to the host). This memory map illustrates one example of what the spare area swapping, as discussed subsequently, is attempting to accomplish.

In the following discussion, it is assumed that the spare area of each page is set aside on a 16 bytes per 512 bytes of user data basis. This ratio of spare area to user data storage area is for purposes of illustration only since the disclosed embodiments are not limited to any particular size of spare area.

It is also assumed that the spare area comprises only metadata as generated by the host and received by the memory device. Since the memory device now performs internal EDAC on data received from the host, the memory device can specify its own locations for storing the parity data that is separate from the spare area (wherein such "additional" spare area may not have an address that is known or available to the host).

Referring to FIG. 2, the memory map includes the address range, in hexadecimal, for each portion of the page. In one embodiment, this address is the physical memory address that is used by a controller on the memory device to store data. In other words, the host provides a logical address to the memory device and the memory device can map that logical address to one of the illustrated physical addresses.

Each address range of the page is assigned to a different type of data. For example, address range 0-3FF is assigned to a first user data storage area (e.g., 1024 bytes of data). Address range 400-41F is assigned to a 32 byte spare area. In one embodiment, this spare area is associated with the user data storage area assigned address range 0-3FF. Similarly, address range 420-81F is assigned to a second user data storage area (e.g., 1024 bytes of data). Address range 820-83F is assigned to the 32 byte spare area associated with the second user data storage area. Address range 840-C3F is assigned to a third user data storage area (e.g., 1024 bytes of data). Address range C40-C5F is assigned to the 32 byte spare area associated with the user data storage area. Address range C60-105F is assigned to a fourth user data storage area (e.g., 1024 bytes of data). Address range 1060-107F is assigned to the 32 byte spare area associated with the fourth user data storage area.

FIG. 2 also illustrates a number operation to page (NOP) field. This is a write sequence indicator for partial page programming of the illustrated page of memory. SLC memory devices are typically limited to a certain number of partial writes per page in order to reduce the amount of program disturb that can occur during programming. For example, one SLC memory device might be limited to only four partial writes per page if it was determined that any more writing to the same page would cause the data on that page to be unreliable. Due to the closer proximity of states in an MLC memory device and, thus, extreme sensitivity to program disturb as compared to SLC memory devices, MLC memory devices do not typically support partial page writes. Alternate embodiments might allow a greater number or an unlimited number of partial page writes to a page of memory for SLC memory devices. Another embodiment might allow partial page writes in an MLC memory device.

The write sequence indicator (e.g., NOP) thus shows a sequence of partial page writes for the page of data illustrated in FIG. 2. For example, the first group of user data and its associated host generated metadata (collectively associated with address range 0-41F) are programmed in a first partial page write operation. The second group of user data and its associated host generated metadata (collectively associated with address range 420-83F) are programmed in a second partial page write operation. The third group of user data and its associated host generated metadata (collectively associated with address range 840-C5F) are programmed in a third partial page write operation. The fourth group of user data and its associated host generated metadata (collectively associated with address range C60-107F) are programmed in a fourth partial page write operation. In each of these groups, with the data and metadata combined into a single contiguous range, ECC can be calculated and stored with the group at the same time thereby allowing a single partial page programming operation (e.g., NOP) to be performed.

Figure 3:
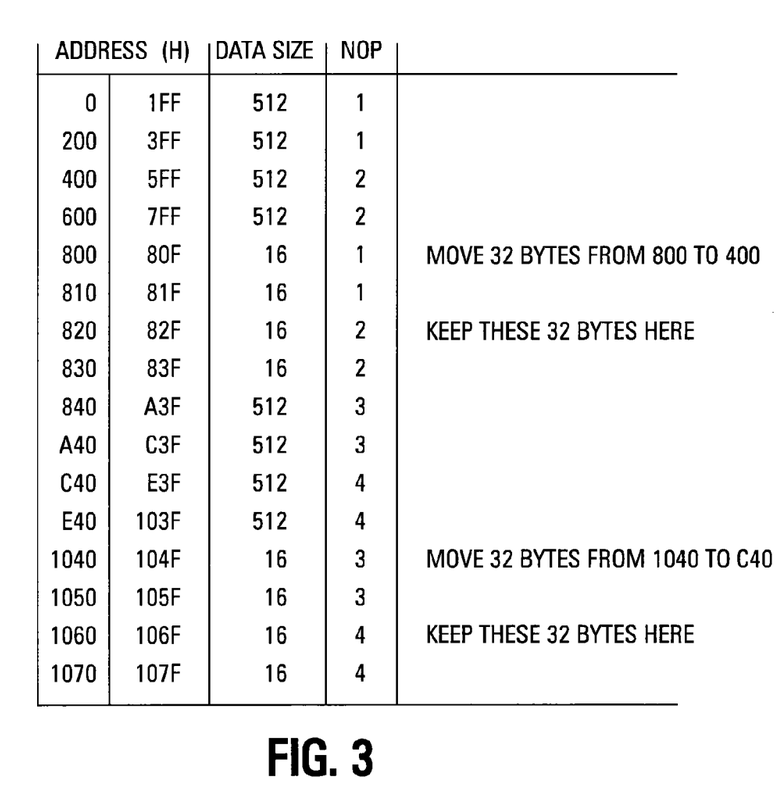
FIG. 3 shows one embodiment of data and associated address ranges from a host.
Figure 4:
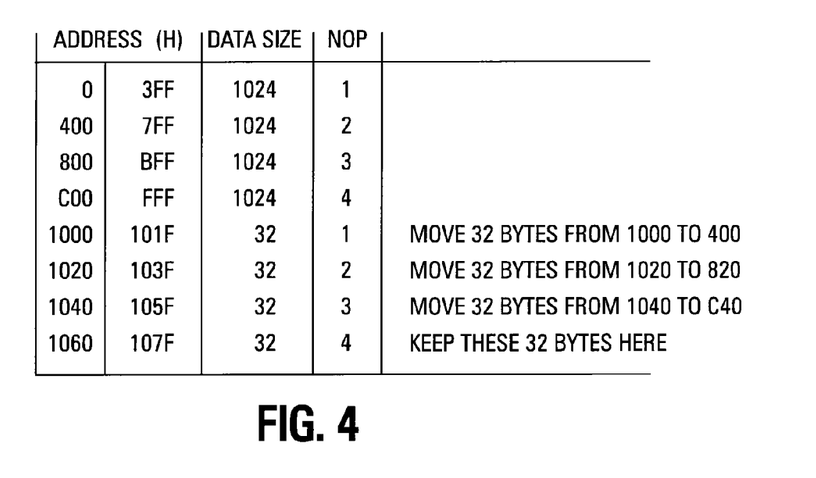
FIG. 4 shows another embodiment of data and associated address ranges from a host.
Figure 5:
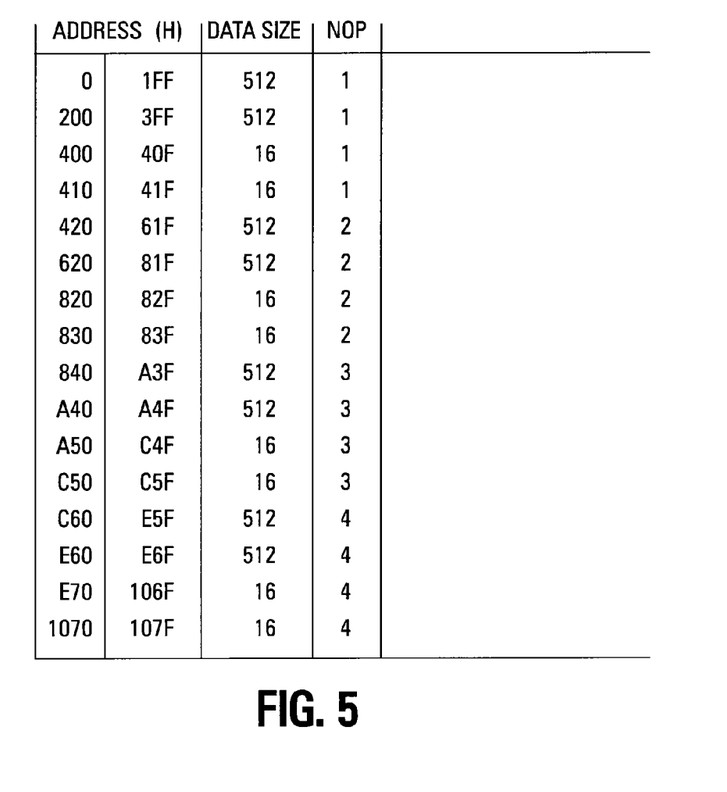
FIG. 5 shows yet another embodiment of data and associated address ranges from a host.

FIGS. 3-5 illustrate different embodiments for memory maps of a page of data as received from a host. In other words, each illustrated address range (in hexadecimal) associated with the data in FIGS. 3-5 is an address range as specified by the host. Thus, the user data might need to be remapped and compacted with its associated metadata prior to being programmed according to the memory map of the memory device (e.g., FIG. 2) in order to avoid conflicts with spare areas set aside for metadata in the memory device. Without remapping and compacting the metadata and its associated data into a standard organization that the memory device can use, ECC will be calculated incorrectly. For example, as illustrated in FIG. 3, the first host write operation will transmit data to the memory device from 0-3FF and to 800 0 81F but the memory will calculate ECC based on a range of 0-41F. Thus, the host data/metadata has to be moved and compacted to a range over which the memory device expects to calculate ECC.

FIG. 3 illustrates an embodiment where the host requests that four 1 k groups of user data plus spare area metadata be programmed to address ranges 0-83F and 840-107F. In this embodiment, the host is instructing that the page data be programmed in 512 byte groups and the metadata be programmed in 16 byte groups. The quantity of total data and the total number of partial page write operations is the same between the memory map of FIG. 2 and the memory map of FIG. 3. The host organization of the data and the spare area metadata is different.

However, it can be seen by referencing the memory map of the memory device illustrated in FIG. 2 that addresses 800-80F are to be used for user data storage and not metadata storage. The memory device has already set aside addresses 400-41F for the metadata. Thus, the 32 bytes of metadata that the host instructs to write to addresses 800-81F are remapped to the 400-41F area. It can be seen from the write sequence indicator (e.g., NOP) that the 1024 bytes of user data that the host instructs to be stored in address range 0-3FF and the metadata remapped from 800 to 400 are compacted into a first partial page write operation.

The 32 bytes of metadata that are instructed to be stored in addresses 820-83F are not remapped. With reference to the memory map of FIG. 2, it can be seen that these addresses are already set aside for metadata.

Similarly, it can be seen by referencing the memory map of the memory device illustrated in FIG. 2 that locations 1040-104F are to be page data storage and not metadata storage. The memory device has already set aside locations C40-C5F for the metadata. Thus, the 32 bytes of metadata that the host instructs to write to locations 1040-104F are remapped to the C40-C5F area. It can be seen from the write sequence indicator (e.g., NOP) that the 1024 bytes of page data that the host instructs to be stored in address range 840-C3F and the metadata remapped from 1040 to C40 are compacted into a third partial page write operation.

The remaining two partial page write operations are already going to user data address ranges as evidenced by the memory map of FIG. 2. Thus, the second partial page write operation comprises user data from 420-7FF compacted with its associated metadata from 820-83F. Similarly, the fourth partial page write operation comprises user data from C60-105F compacted with its associated metadata from 1060-107F.

In the embodiment of FIG. 3, it can be seen from the write sequence indicators (e.g., NOP) that the memory device, besides remapping the metadata to the assigned memory address range to avoid conflicting addresses, is compacting the 16 write operations from the host into four partial page write operations. Thus, the number of partial page write operations to the memory page will not exceed the partial page write limitation.

FIG. 4 illustrates an embodiment where the host requests that all of the user data be programmed to address range 0-FFF and all of the metadata be programmed to address range 1000-107F. In this embodiment, the host is sending write commands with 1024 bit groups of user data and 32 bit groups of metadata. However, as can be seen in the memory map of the memory device (e.g., FIG. 2), the metadata write requests from the host for address ranges 1000-105F would conflict with the address ranges assigned to user data. Thus, the metadata associated with address range 1000-101F should be remapped to address range 400-41F, the metadata associated with address range 1020-103F should be remapped to address range 820-83F, and the metadata associated with address range 1040-105F should be remapped to address range C40-C5F.

With reference to FIG. 4, it can be seen that the write sequence indicator (e.g., NOP) shows that, when the metadata is remapped from 1000-101F, the metadata is compacted with the user data at address range 0-3FF into a first partial page write operation. Similarly, the metadata that is remapped from address range 1020-1037 is compacted with the user data at address range 400-7FF into a second partial page write operation. The user data should be moved up accordingly after the metadata is remapped. After moving 32 bytes from 1000 to 400, the user data from 400-7FF needs to be moved to 420-81F. The metadata that is remapped from address range 1040-105F is compacted with the user data at address range 800-BFF into a third partial page write operation. The fourth partial page write operation comprises the user data at address range C00-FFF compacted with the metadata at address range 1060-107F. The metadata at this address range is not required to be remapped since the memory map of FIG. 2 shows that this address range is already assigned to metadata so that there would not be a conflict.

In the embodiment of FIG. 4, it can be seen from the write sequence indicators (e.g., NOP) that the memory device, besides remapping the metadata to the assigned memory address range to avoid conflicting addresses, is converting four discontiguous write operations to be four contiguous write operations. Thus, the number of partial page write operations to the memory page will not exceed the partial page write specification.

FIG. 5 illustrates an embodiment where the host requests that the user data be programmed to address ranges 0-20F, 420-62F, 840-A4F, and C60-E6F and the metadata to address ranges 210-41F, 630-83F, A50-C5F, and E70-107F. In this embodiment, the host is sending write commands with 512 bit groups of page data and 16 bit groups of metadata.

Referencing the memory map of the memory device (e.g., FIG. 2), it can be seen that there are no address range conflicts in this embodiment. Thus, remapping of the metadata is not necessary to avoid conflicts between what the host requests and the actual memory map of the memory device.

However, in order to remain within the partial page write operation specification of the memory device, the user data and the metadata still needs to be compacted into a reduced number of partial page write operations. Thus, as can be seen by the write sequence indicators (e.g., NOP), the user data from address ranges 0-1FF and 200-3FF are compacted with their associated metadata from address ranges 400-40F and 410-41F into a first partial page write operation. The user data from address ranges 420-61F and 620-81F are compacted with their associated metadata from address ranges 820-82F and 830-83F into a second partial page write operation. The user data from address ranges 840-A3F and A40-A4F are compacted with their associated metadata from address ranges A50-C4F and C50-C5F into a third partial page write operation. The user data from address ranges C60-E5F and E60-E6F are compacted with their associated metadata from address ranges E70-106F and 1070-107F into a fourth partial page write operation.

The memory map embodiments illustrated in FIGS. 2-5 are for purposes of illustration only. The memory device can have a memory map where the user data and associated metadata are assigned to different address ranges. Similarly, the host can attempt to write user data and metadata in any order within a page to an internal EDAC memory device that has a finite partial page write count. The memory device can be configured to avoid conflicts between the metadata and user data. The compacting of user data with its associated metadata into one partial page write can also avoid data discontinuities in the page address space, thereby staying within the allowed partial page programming specification per page.

Figure 6:
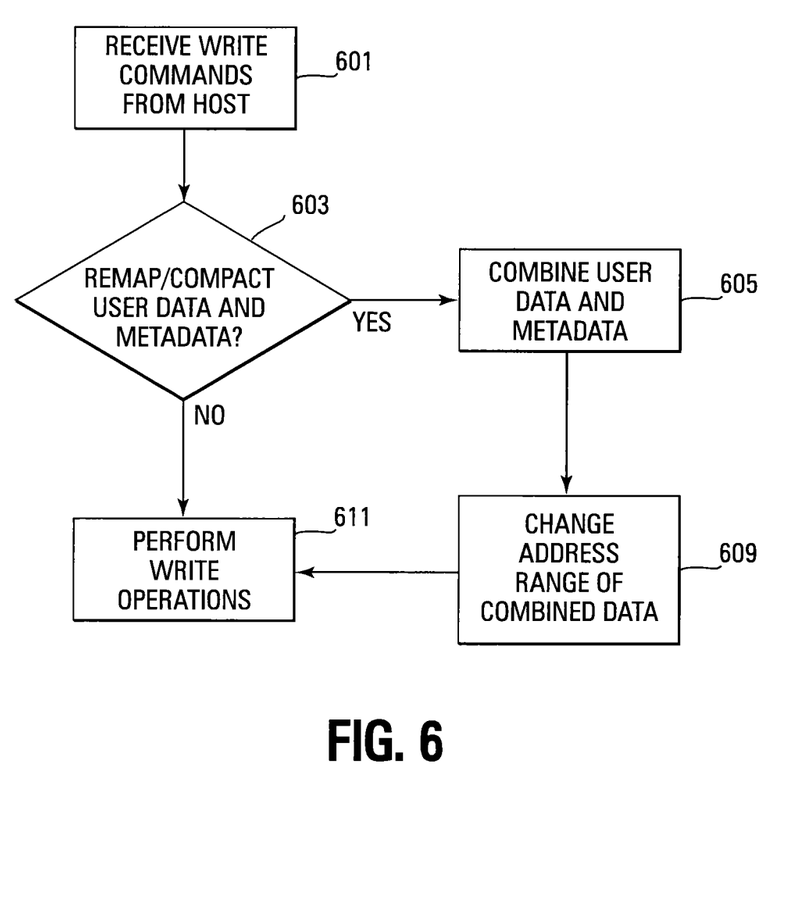
FIG. 6 shows a flowchart of one embodiment of a method for remapping and/or compacting received data.

FIG. 6 illustrates a flowchart of one embodiment of a method for remapping and/or compacting received data. At least one write command is received from a host 601. The write command comprises user data and metadata with their associated address ranges, as illustrated in the embodiments of FIGS. 3-5. The method of FIG. 6 attempts to compact and remap the data so that data is remapped from the original received address range(s) (as seen in memory maps of FIGS. 3-5) to the address ranges illustrated in the memory map of FIG. 2.

The memory device analyzes the address range(s) received from the host in the received write command and determines if compaction/remapping is necessary 603. If the memory device determines that the host is requesting that metadata be stored in address ranges that conflict with the memory device's memory map, compaction 605 and remapping 609 is necessary. In an alternate embodiment, compaction might be necessary if the quantity of write sequences is greater than a particular threshold.

If compaction/remapping is required, the memory device combines the page data and associated metadata into a reduced number of partial page write operations 605 to remain within the memory device limitations. 607. The compacted user data and associated metadata are remapped to the appropriate address ranges 609 (e.g., a single contiguous address space). The write operations are then performed to memory 611 using the new address range.

Figure 7:
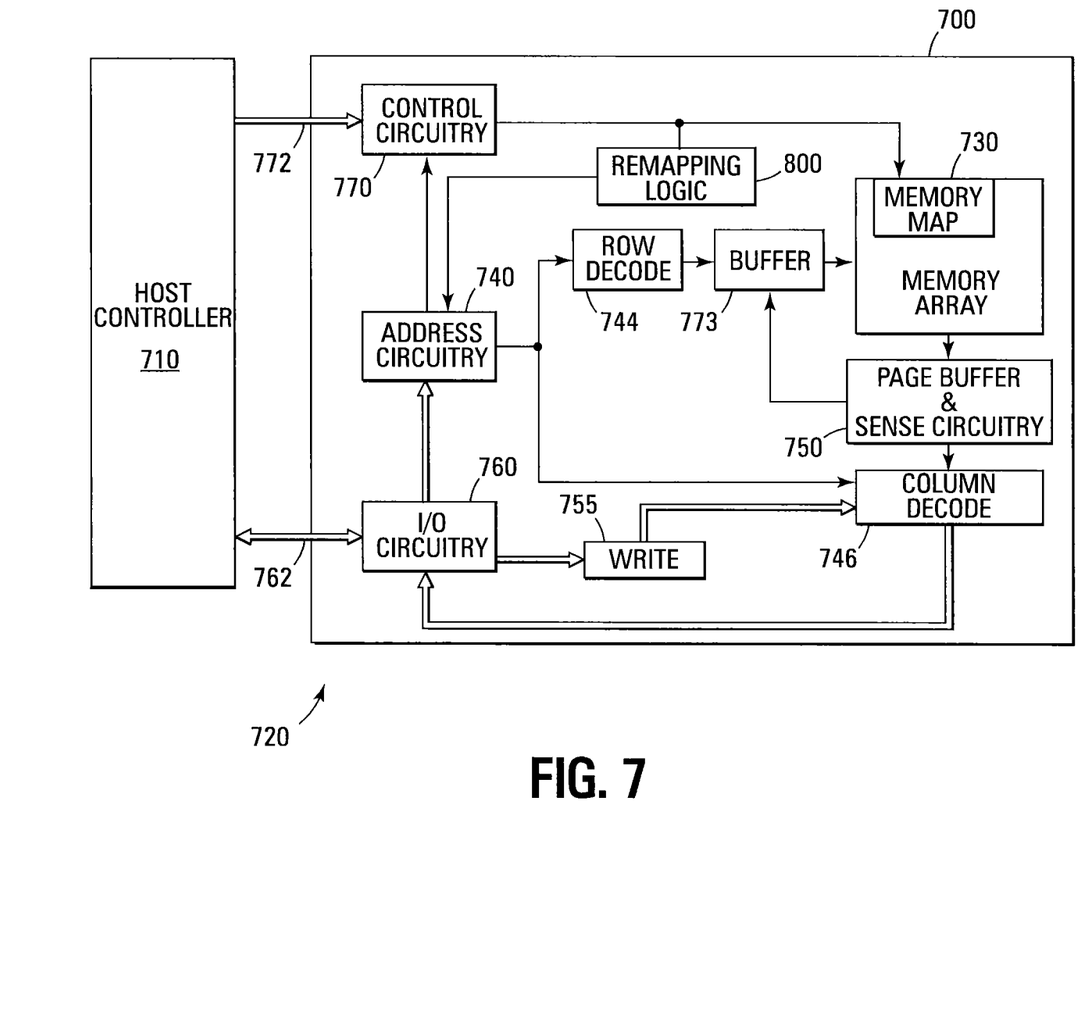
FIG. 7 shows a block diagram of one embodiment of a system that can incorporate a memory device using the described method for remapping and/or compaction.

FIG. 7 illustrates a functional block diagram of a memory device 700 that can comprise a memory array architecture such as illustrated in FIG. 1. The memory device 700 is coupled to an external controller 710 or other external circuitry. The external controller 710 may be a microprocessor or some other type of controller. The external controller 710 can be the host that is configured to transmit the write commands, as discussed previously. The memory device 700 and the external controller 710 form part of a system 720.

The memory device 700 includes an array 730 of memory cells (e.g., NAND architecture non-volatile memory cells). The memory array 730 is arranged in banks of word line rows and bit line columns. In one embodiment, the columns of the memory array 730 comprise series strings of memory cells.

Address buffer circuitry 740 is provided to latch address signals provided through I/O circuitry 760. Address signals are received and decoded by a row decoder 744 and a column decoder 746 to access the memory array 730. A row buffer 773 can be used to buffer data prior to input to the memory array 730.

The memory device 700 reads data in the memory array 730 by sensing voltage or current changes in the memory array columns using sense circuitry/page buffers 750. The sense circuitry 750, in one embodiment, is coupled to read and latch a row of data from the memory array 730. The sense circuitry 750, as previously described, includes the sense circuitry as well as other circuits (e.g., page buffers) for performing a program verify operation. The sense circuitry/page buffers 750 can move data to the row decoder 744 as well. Data are input and output through the I/O circuitry 760 for bidirectional data communication as well as the address communication over a plurality of data connections 762 with the controller 710. Write circuitry 755 is provided to write data to the memory array.

An internal memory controller (e.g., control circuitry and/or firmware) 770 decodes signals provided on a control interface 772 from the external host controller 710. These signals are used to control the operations on the memory array 730, including data read, data write (program), and erase operations. The internal memory controller 770 may be a state machine, a sequencer, or some other type of control circuitry that is configured to control generation of memory control signals. In one embodiment, the internal memory controller 770 is configured to control programming of the memory cells such as disclosed in the remapping and/or compacting method of FIG. 6. In other words, the memory controller 770 can control the remapping and compacting as described previously. In an alternate embodiment, remapping logic 800 can be used as illustrated subsequently in FIG. 8.

The memory device illustrated in FIG. 7 has been simplified to facilitate a basic understanding of the features of the memory. A more detailed understanding of internal circuitry and functions of flash memories are known to those skilled in the art.

The host controller 710, in one embodiment, can configure the memory device to perform the remapping as illustrated previously. For example, at power up or whenever the memory device is initialized, the host controller 710 can transmit the memory map of FIG. 2 to the memory device so that the memory device can remap received data into that particular memory map. In another embodiment, the memory map of FIG. 2 can be stored in a non-volatile area of the memory device and loaded into a volatile portion of remapping logic on power-up.

Figure 8:
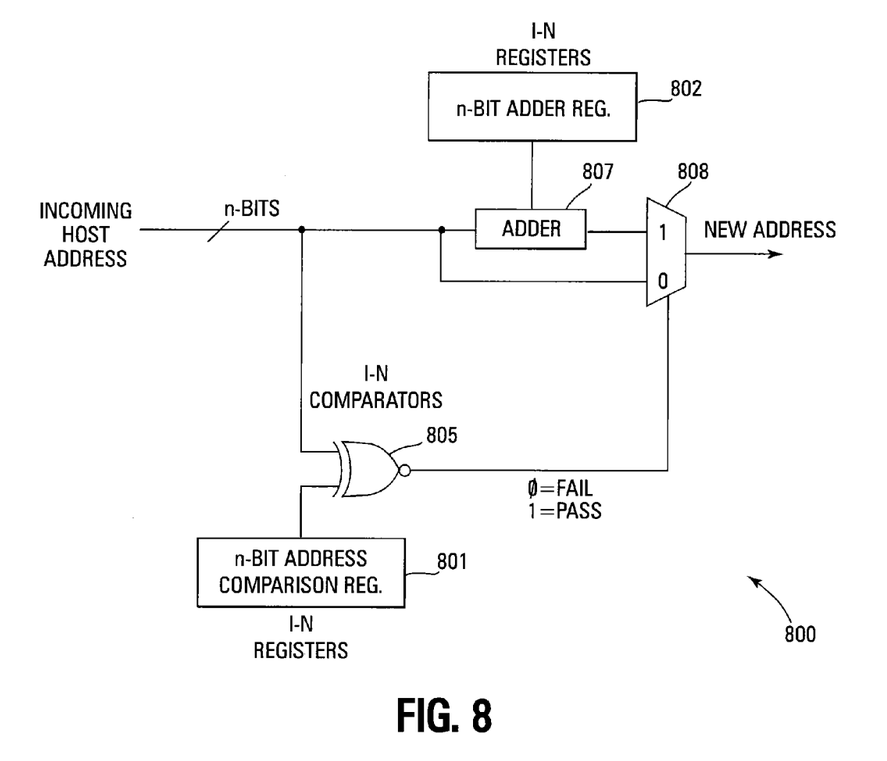
FIG. 8 shows a block diagram of one embodiment of remapping logic.

FIG. 8 illustrates one embodiment of remapping logic that can be used with the above described remapping method. The logic comprises a received address line (e.g., 0-n bits) coupled to one input of an adder block 807, one input of a comparator 805 (e.g., XNOR gate), and one input of a 2:1 multiplexer 808. One n-bit register 801 that stores an n-bit address has an output coupled to the other input of the comparator 805. A second n-bit register 802 has an output coupled to a second input of the adder block 807. The output of the adder block 807 is coupled to the other input of the 2:1 multiplexer 808. The output of the multiplexer is the new address to which the data is remapped.

The registers 801, 802 can be either volatile registers or non-volatile registers. If the registers 801, 802 are volatile they can be programmed by the host or loaded by the memory device controller from non-volatile memory at power-up of the memory device. If the registers 801, 802 are non-volatile, they can be programmed once. There can be a quantity of 1-N n-bit registers 801, 802 where "N" is an indication of the number of comparison ranges desired to be supported and "n" is the quantity of address bits in the address. Each of the address comparison register(s) 801 is coupled to a different one of the 1-N associated comparators 805.

The address comparison register(s) 801 are each loaded with a starting address for each address discontinuity. The adder register(s) 802 are each loaded with a different address offset to be added to the received host address to form the page address to which the compacted data is to be remapped.

In operation, a received host address is compared, through the 1-N comparators 805, with each discontinuity starting address from the registers 801. The comparator then outputs a logic signal indicating whether the addresses match. In one embodiment, the comparator 805 can output a logic 0 when the comparison fails (e.g., received address is different from register address) or a logic 1 when the comparison passes (e.g., received address matches register address).

The received address is input to the adder block 807 where the stored address offset is added to the received address to generate the remapping address. Both the remapping address and the received address are presented at the inputs of the multiplexer that then selects between these two addresses in response to the result of the comparison operation. In one embodiment, if the comparison failed, the received address is selected and the data is not remapped. If the comparison passed, the remapping address is selected.

In another alternate embodiment for remapping, the remapping can be accomplished by a hidden page (e.g., usable only by remapping method) in non-volatile memory that is loaded into the remapping logic on power-up of the memory device. The hidden page has one or more remapping address bytes that correspond to each normal NAND page byte and each remapping address byte indicates if the received page address is user data or metadata and to which sector it should be remapped. If the intended page address is user data, no remapping is performed. If the intended page address is metadata, the remapping address byte is used for remapping. Thus, the hidden page is essentially a static memory management unit that provides a common remapping for each page in the NAND memory device.

CONCLUSION

In summary, one or more embodiments of a method for compacting and/or remapping user data and metadata can enable a host to perform page write operations in any order and/or location within the page of a memory device. The memory device can then remap and/or compact the user data and metadata into a potentially reduced number of partial page write operations that remain within the partial page write specification of the memory device.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention.

What is claimed is:

1. A method for remapping and/or compacting data in a memory device, the method comprising:
   receiving a first quantity of write operations from a host, wherein the first quantity of write operations comprises a plurality of groups of user data each having a specified address range and a plurality of groups of metadata each having a specified address range;
   determining whether the specified address range of a particular group of metadata of the plurality of groups of metadata is contiguous with the specified address range of a particular group of user data of the plurality of groups of user data that is associated with the particular group of metadata;
   remapping the specified address range of the particular group of metadata to an address range that is contiguous with the specified address range of the particular group of user data in response to determining that the specified address range of the particular group of metadata and the specified address range of the particular group of user data are not contiguous; and
   reducing the first quantity of write operations received from the host to a second quantity of write operations for programming to the memory device.

2. The method of claim 1 wherein the second quantity of write operations is within a partial page write specification of the memory device.

3. The method of claim 1 wherein reducing comprises compacting the plurality of groups of page data and the plurality of groups of metadata into one partial page write operation.

4. The method of claim 1 wherein the memory device is configured to generate error detection and correction data responsive to the reducing.

5. A method for remapping and/or compacting data in a memory device, the method comprising:
   comparing received address ranges, from a first quantity of received write operations, to a memory map of a page of the memory device; and
   compacting data from each of the first quantity of received write operations into a second quantity of partial page write operations in response to the received addresses conflicting with the memory map such that the second quantity of partial page write operations comprise a single contiguous address range;
   wherein the second quantity of partial page write operations is less than the first quantity of received write operations;
   wherein the received address ranges comprise a received address range for user data of the first quantity of write operations and a received address range for metadata of the first quantity of write operations, the metadata associated with the user data, and further comprising:
   remapping the received address range for the group of metadata to a range of addresses that is contiguous with the received address range for the user data in response to the received address range for the user data and the received address range for the metadata not being contiguous.

6. The method of claim 5 wherein the compacting and remapping are performed by a number of partial page write operations that is within a specification of partial page write operations for the memory device.

7. The method of claim 5 and further including a host transmitting the memory map to the memory device.

8. The method of claim 7 wherein the host transmits the memory map to the memory device at power-up of the memory device.

9. The method of claim 5 wherein the memory map is loaded from a non-volatile memory of the memory device to a volatile memory of the memory device at power-up of the memory device.

10. The method of claim 9 wherein the volatile memory is in a portion of remapping logic.

11. A memory device comprising:
    an array of memory cells; and
    a memory controller configured to control programming of the array of memory cells;
    wherein the memory device is configured to receive a first quantity of write operations from a host coupled to the memory device, the first quantity of write operations comprising a plurality of groups of user data each having a specified address range and a plurality of groups of metadata each having a specified address range;
    wherein the memory controller is configured to determine whether the specified address range of a particular group of metadata of the plurality of groups of metadata is contiguous with the specified address range of a particular group of user data of the plurality of groups of user data that is associated with the particular group of metadata;

wherein the memory controller is configured to remap the specified address range of the particular group of metadata to an address range that is contiguous with the specified address range of the particular group of user data in response to determining that the specified address range of the particular group of metadata and the specified address range of the particular group of user data are not contiguous; and wherein the memory controller is configured to reduce the first quantity of write operations to a second quantity of write operations for programming to the memory device in a single, contiguous address range.

12. The memory device of claim 11 wherein the memory device is configured to be an internal error detection and correction memory device.

13. The memory device of claim 12 wherein the internal error detection and correction memory device is configured to generate error correction code.

14. The memory device of claim 11 wherein the memory device is a single level cell memory device.

15. The memory device of claim 14 wherein the single level cell memory device comprises a limited number of partial page programming operations per page of memory.

16. A memory device comprising:
an array of memory cells organized into pages of memory, each page having a page data area at a first particular range of addresses and configured to store only user data and a spare area at a second particular range of addresses contiguous with the first particular range of addresses and configured to store only metadata associated with the user data stored in the page data area, each page limited to a particular number of partial page write operations; and
a memory controller configured to control programming of the array of memory cells, the memory controller configured to receive a write operation comprising user data to be programmed to the first particular range of addresses and metadata, associated with the user data to be programmed to the first particular range, to be programmed to a third particular range of addresses, the memory controller further configured to remap the metadata to the second particular range of addresses when the third particular range of addresses is not contiguous with the first particular range of addresses, the memory controller further configured to reduce a plurality of received write operations to a number that is within the particular number of partial page write operations.

17. The memory device of claim 16 wherein the memory controller is further configured to compact a plurality of received write operations into one partial page write operation.

18. The memory device of claim 17 wherein the one partial page write operation includes the remapped metadata.

19. The memory device of claim 17 wherein the memory controller is further configured to compact both page data and metadata for the one partial page write operation.

20. A system comprising:
a host configured to transmit a plurality of write commands for programming a page of memory, each write command comprising a plurality of groups of user data and a plurality of groups of metadata, each group of user data having a specified address range and each group of metadata having a specified address range; and
a memory device coupled to the host, the memory device comprising:
an array of memory cells that are organized into a plurality of pages of memory that include the page of memory, the array of memory cells further having a memory map having particular data type memory with associated particular address ranges; and
a memory controller coupled to the array of memory cells, the memory controller configured to determine whether the specified address range of a particular group of metadata of the plurality of groups of metadata is contiguous with the specified address range of a particular group of user data of the plurality of groups of user data that is associated with the particular group of metadata and to remap the specified address range of the particular group of metadata to an address range that is contiguous with the specified address range of the particular group of user data in response to determining that the specified address range of the particular group of metadata and the specified address range of the particular group of user data are not contiguous.

21. The system of claim 20 wherein the memory controller is further configured to compare the specified address range of each group of user data and the specified address range of each group of metadata to the memory map.

22. The system of claim 20 wherein the particular data type memory comprises user data memory and metadata memory.

23. The system of claim 20 wherein the memory device comprises a NAND single level cell memory configured to accept only a limited number of partial page write operations.

24. The system of claim 20 wherein the host is configured to load the memory map to the memory device.

25. A memory device comprising:
an array of memory cells organized into pages of memory, each page having a page data area at a first particular range of addresses and configured to store only user data and a spare area at a second particular range of addresses and configured to store only metadata associated with the user data stored in the page data area, each page limited to a particular number of partial page write operations;
address circuitry configured to generate addresses for the array of memory cells; and
remapping logic coupled to the address circuitry and configured to remap received metadata when a received address range associated with the metadata matches one of a plurality of discontinuity starting addresses stored in the remapping logic;
wherein the received address range that matches the one of a plurality of discontinuity starting addresses is the first particular range of addresses of a page of memory of the array of memory cells being written to.

26. A memory device comprising:
an array of memory cells organized into pages of memory, each page having a page data area at a first particular range of addresses and a spare area at a second particular range of addresses, each page limited to a particular number of partial page write operations;
address circuitry configured to generate addresses for the array of memory cells; and
remapping logic coupled to the address circuitry and configured to remap received user data when a received address range associated with the user data matches one of a plurality of discontinuity starting addresses stored in the remapping logic;

wherein the remapping logic comprises:
- a plurality of first registers each configured to store a different address offset;
- a plurality of second registers each configured to store a different discontinuity starting address;
- a plurality of comparators, each comparator coupled to a different one of the second registers and the received address range, each comparator configured to output a comparison signal in response to a comparison of the received address range and the discontinuity starting address from an associated second register;
- an adder coupled to the plurality of first registers and the received address range and configured to output a remapping address in response to a sum of the address offset and the received address range; and
- a multiplexer coupled to the adder, the received address range, and the plurality of comparators wherein the multiplexer is configured to output one of the remapping address or the received address range in response to the comparison signal.

* * * * *